United States Patent
Wakudkar et al.

(10) Patent No.: US 12,549,992 B2
(45) Date of Patent: Feb. 10, 2026

(54) TRAFFIC STATISTICS COORDINATION AND ACCOUNTING SESSION MANAGEMENT IN MULTI-LINK OPERATIONS

(71) Applicant: Cisco Technology, Inc., San Jose, CA (US)

(72) Inventors: Sachin D. Wakudkar, St-Sulpice (CH); Shailender Potharaju, Fremont, CA (US); Ardalan Alizadeh, Milpitas, CA (US); Ugo M. Campiglio, Morges (CH)

(73) Assignee: Cisco Technology, Inc., San Jose, CA (US)

( * ) Notice: Subject to any disclaimer, the term of this patent is extended or adjusted under 35 U.S.C. 154(b) by 350 days.

(21) Appl. No.: 18/455,962

(22) Filed: Aug. 25, 2023

(65) Prior Publication Data

US 2025/0071585 A1    Feb. 27, 2025

(51) Int. Cl.
*H04W 24/10* (2009.01)
*H04W 24/08* (2009.01)
*H04W 76/15* (2018.01)

(52) U.S. Cl.
CPC ........... *H04W 24/10* (2013.01); *H04W 24/08* (2013.01); *H04W 76/15* (2018.02)

(58) Field of Classification Search
CPC ............... H04W 52/0229; H04L 12/1432
USPC ......................................................... 709/230
See application file for complete search history.

(56) References Cited

U.S. PATENT DOCUMENTS

| | | | |
|---|---|---|---|
| 8,332,529 B1 * | 12/2012 | Shetty | G11B 27/105 |
| | | | 709/230 |
| 2003/0223450 A1 | 12/2003 | Bender et al. | |
| 2021/0076249 A1 | 3/2021 | Hsu et al. | |
| 2022/0287122 A1 | 9/2022 | Wang et al. | |
| 2023/0071851 A1 | 3/2023 | Gan et al. | |
| 2023/0110142 A1 | 4/2023 | Gan et al. | |

(Continued)

FOREIGN PATENT DOCUMENTS

| | | | | |
|---|---|---|---|---|
| EP | 1039694 B1 | 12/2005 | | |
| JP | 7564952 B2 * | 10/2024 | ............ | H04W 24/10 |
| JP | 2025507743 A * | 3/2025 | ............ | H04W 84/12 |

(Continued)

OTHER PUBLICATIONS

International Search Report and Written Opinion for International Application No. PCT/US2024/040632, mailed Nov. 5, 2024, 16 Pages.

*Primary Examiner* — William D Cumming
(74) *Attorney, Agent, or Firm* — Patterson + Sheridan, LLP

(57) ABSTRACT

Techniques for coordinating traffic statistics and managing accounting sessions for multi-link operation are provided. A first communications link with a second network device is established by a first network device. A first accounting request to a third network device is transmitted by the first network device, where the first accounting request indicates that the second network device comprises a station multi-link device (STA MLD). A first accounting response is received by the first network device, indicating whether the third network device supports statistic aggregation. Traffic statistics for the first communication link is collected by the first network device, and reported to the third network device in accordance with the first accounting response.

20 Claims, 10 Drawing Sheets

(56) References Cited

U.S. PATENT DOCUMENTS

2024/0049316 A1* 2/2024 Ajami ............... H04W 52/0229
2025/0071585 A1* 2/2025 Wakudkar ........... H04L 12/1432

FOREIGN PATENT DOCUMENTS

| KR | 20240053578 A * | 4/2024 | ............ H04W 48/14 |
| --- | --- | --- | --- |
| WO | 2022233427 A1 | 11/2022 | |
| WO | WO-2025049040 A1 * | 3/2025 | ............ H04W 24/08 |
| WO | WO-2025147182 A1 * | 7/2025 | ............ H04W 84/12 |

* cited by examiner

TRAFFIC STATISTICS COORDINATION AND ACCOUNTING SESSION MANAGEMENT IN MULTI-LINK OPERATIONS

TECHNICAL FIELD

Embodiments presented in this disclosure generally relate to wireless communication. More specifically, embodiments disclosed herein relate to coordinating traffic statistics and managing accounting sessions in multi-link operations (MLO).

BACKGROUND

Conventional traffic statistics reporting processes in wireless networking typically begin at an access point (AP), which records data traffic for each associated station (STA). The AP then forwards the recorded data to the wireless controller or the Remote Authentication Dial-In User Service (RADIUS) server for further processing and record updating. The reported statistics provide a detailed picture of network usage for each STA and, therefore, serve as a valuable resource for managing and optimizing network performance. For example, the statistics can be used for billing purposes, helping to calculate usage charges for specific STAs based on the amount of data transmitted and received. Moreover, in terms of bandwidth management, the traffic statistics can help administrators understand the actual usage patterns of a network, enabling them to adjust the network parameters for optimal performance. Additionally, the statistics provide valuable insights in network security, such as identifying unusual patterns of behavior (such as a sudden surge in traffic or a usual slowdown), and therefore can be used to identify a security threat or detect a potential policy violation.

However, with the development of WiFi 8, the complexity of traffic statistics report processing has increased significantly. One major change is that a single station multi-link device (STA MLD) can now be associated with multiple APs simultaneously. This shift creates a challenge where the conventional reporting methods, which track data from a single AP for a specific STA, may not provide a complete and accurate picture of the actual usage statistics. The underlying reason is that each AP independently reports usage statistics for the same STA to the RADIUS server, with no aggregation across all the associated links. Therefore, new approaches for tracking and aggregating data from multiple APs are needed to ensure a comprehensive, accurate, and synchronized representation of network usage.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
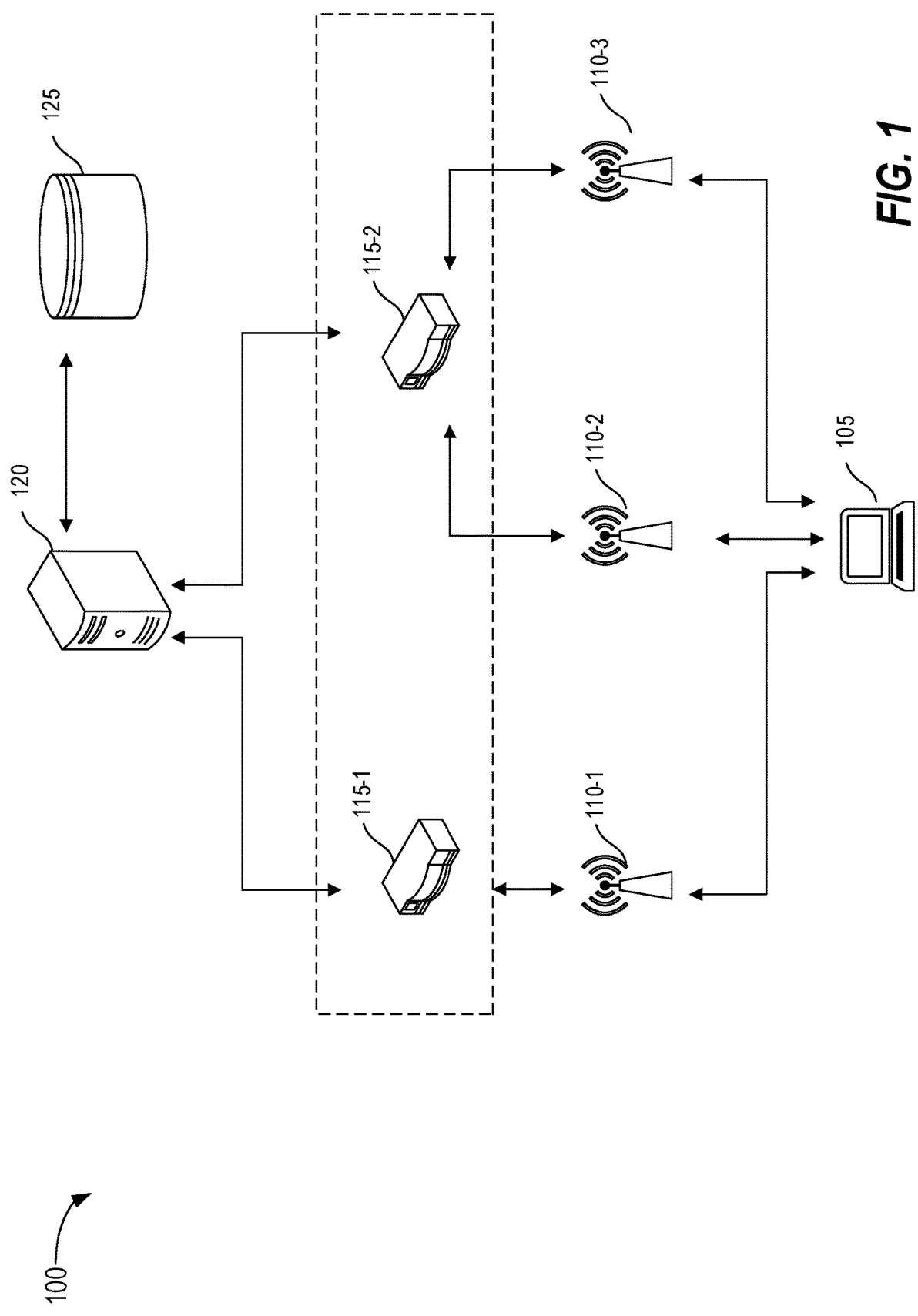
FIG. 1 depicts an example environment that supports accounting management for a multi-link device (MLD), according to some embodiments of the present disclosure.

One embodiment presented in this disclosure provides a method, including establishing, by a first network device, a first communications link with a second network device, transmitting, by the first network device, a first accounting request to a third network device, where the first accounting request indicates that the second network device comprises a station multi-link device (STA MLD), receiving, by the first network device, a first accounting response indicating whether the third network device supports statistic aggregation, collecting, by the first network device, traffic statistics for the first communication link, and reporting the traffic statistics to the third network device in accordance with the first accounting response.

Other embodiments in this disclosure provide non-transitory computer-readable mediums containing computer program code that, when executed by operation of one or more computer processors, performs operations in accordance with one or more of the above methods, as well as systems comprising one or more computer processors and one or more memories containing one or more programs which, when executed by the one or more computer processors, performs an operation in accordance with one or more of the above methods.

Example Embodiments

Embodiments of the present disclosure provide techniques and technologies for coordinating traffic statistics and managing accounting sessions in multi-link operations (MLO).

Under the current standard 802.11be, there is no explicit guideline for the aggregation or coordination of traffic statistics across multiple AP MLDs, especially when these multiple AP MLDs are connected to a single STA MLD via multiple links, utilizing MLO techniques for data transmission and/or reception. As a result, multiple accounting sessions may be created for the STA MLD (e.g., one session initiated by each AP MLD to which the STA MLD is associated), which may exhaust the resources of an accounting server (e.g., a RADIUS server), and compromise its ability to accurately record the STA MLD's usage statistics. Some embodiments of the present disclosure introduce a mechanism that allows the accounting server and/or a primary AP MLD to aggregate and/or coordinate the traffic statistics reported by multiple AP MLDs. This new mechanism enables the precise tracking of traffic statistics for the STA MLD, and thereby enhances the overall efficiency and effectiveness of the network accounting process. As used herein, an "accounting server" may refer to a system or device that is responsible for tracking, recording, and managing user-based network traffic within a network. One example of an accounting server is a Remote Authentication Dial-In User Service (RADIUS) server, which utilizes the RADIUS protocol to provide centralized accounting service for users who connect and use a network service.

In one embodiment, an accounting server (e.g., a RADIUS server) may receive an accounting-start request from an AP MLD (or a wireless local-area network (LAN) controller (WLC)). The request may indicate that the accounting session will be used for a STA MLD (potentially indicated using a newly dedicated Vendor Specific Attribute (VSA)). Upon the reception of this request, the accounting server may send an accounting-start response to the AP MLD (or the WLC), indicating capability of the AP MLD to support statistics aggregation (e.g., communicated using another dedicated VSA). Relying on the response, the AP MLD (or the WLC) may then transmit the traffic statistics (referring to the data transmitted or received on the link between the AP MLD and the STA MLD) directly to the account server, along with an identifier (such as the address (e.g., Medium Access Control (MAC) address)) of the STA MLD. Following this, the accounting server may aggregate the statistics received from different AP MLDs (or WLCs), based on the reported identifier (e.g., MAC address) of the STA MLD.

In some embodiments, the accounting server may not support the statistics aggregation function. In some such embodiments, upon receiving the accounting-start request from an AP MLD (or a WLC) for a STA MLD, the accounting server may check if there is an active accounting session for the STA MLD. If no active session exists, the accounting server may record the statistics and send an accounting-start response to the AP MLD (or the WLC), designating the requesting AP MLD (or the WLC) as the primary AP/controller, and including the address (e.g., Internet Protocol (IP) address) of the requesting AP MLD (or the WLC). If an active session for the STA MLD already exists (e.g., created by another AP MLD (or another WLC)), the accounting server may send an accounting-start response without recording the statistics, indicating, to the requesting AP MLD (or the WLC), the identifier of the primary AP/controller. The primary AP/controller may refer to the AP that first establishes the active accounting session for the STA MLD. The identifier may refer to the address (e.g., Internet Protocol (IP) address) of this primary AP/controller. The information within the accounting-start response may be communicated using another dedicated VSA. The requesting AP MLD (or the WLC), upon receiving the response, may identify the primary AP/controller based on the received address. If the requesting AP MLD (or the WLC) recognizes itself as the primary AP, it may proceed to aggregate the statistics received from other secondary AP MLDs with the statistics it has been tracking, and generate a final, consolidated statistics regarding the network usage of the STA MLD. On the other hand, if the requesting AP MLD (or the WLC) identifies another AP MLD (or WLC) as the primary AP/controller, it may proceed to forward the STA MLD's statistics to the primary AP/controller, along with the address (e.g., MAC address) of the STA MLD. This approach may allow for effective coordination of traffic statistics across all links, even when the accounting server does not support the statistics aggregation function.

FIG. 1 depicts an example environment 100 that supports accounting management for a multi-link device (MLD), according to some embodiments of the present disclosure. In the illustrated environment 100, a STA MLD 105 (e.g., a station or client device that acts as a multilink device) connects to multiple AP MLDs 110-1, 110-2, 110-3 (e.g., access points that act as multilink devices). Each of these AP MLDs reports traffic statistics (also referred to in some embodiments as "usage statistics," or "network statistics") to one or more wireless local-area network (LAN) controllers (WLC). For example, as illustrated, the AP MLD 110-1 reports traffic statistics of the STA MLD 105 to the WLC 115-1, and the AP MLDs 110-2 and 110-3 report traffic statistics of the STA MLD 105 to the WLC 115-2. The WLCs 115-1 and 115-2, in turn, report the received traffic statistics to the accounting server 120 for accounting purposes. The accounting server 120 further connects to a database 125, which is used for storing and retrieving data relevant to the network traffic and accounting management. As used herein, the "traffic statistics," "usage statistics," or "network statistics" may refer to the data transmitted or received on the link between the STA MLD and each respective AP MLD.

The STA MLD 105 may alternatively be referred to in some embodiments as stations (STA), client devices, user devices, mobile devices, and the like. The STA MLD 105 may be any type of device that can connect to a local wireless network (e.g., WiFi) through one or more APs, including but not limited to traditional computing devices such as desktop computers, laptops, servers, tablets, smart phones, and wearable devices, as well as a growing number of Internet of Things (IoT) devices such as smart home devices, fitness trackers, industrial sensors, and the like.

In some embodiments, the AP MLD (e.g., 110-1, 110-2, or 110-3) may be referred to in some embodiments as simply an access point (AP). The AP MLD (e.g., 110-1, 110-2, or 110-3) may be any type of access point device that can act as an interface between wireless devices (e.g., a STA MLD) and the network infrastructure (e.g., WiFi).

In the illustrated example, the accounting server 120 refers to a network device that centralizes the management of authentication, authorization, and accounting processes in a network. The management of the accounting process involves tracking a user's network usage statistics, including collecting information such as the amount of data transferred, the services used, the duration of the connection, and the like. The usage statistics may then be used for a variety of purposes, such as billing, resource allocation, capacity planning, and usage pattern analysis. The accounting process generally begins when the accounting server 120 receives an accounting-start request from a user or client device (e.g., the STA MLD 105) through its connected AP MLDs (e.g., 110-1, 110-2, or 110-3) or WLCs (e.g., 115-1, or 115-2), signaling the start of a new session. The request may include several attributes, such as the user's identification, the session identifier, and the time the session starts. As the session continues, interim update messages may be sent at regular intervals to provide ongoing information about the session. When the session ends, an accounting-stop request is sent by the user or client device through its connected AP MLDs or WLCs, which includes the final usage statistics of the session. The final usage statistics may then be saved in the database 125 connected to the accounting server 120, and used later for analysis, billing, or auditing purposes. In some embodiments, the accounting server 120 may refer to a RADIUS server.

In the illustrated example, the STA MLD 105 may communicate with the AP MLDs 110-1, 110-2, and 110-3 via different links. For example, the STA MLD 105 may receive downstream data from the AP MLD 110-1 via one link, and may simultaneously upload upstream data to the AP MLD 110-2 via a different link. These individual links may use separate communication channels (e.g., 2.4 GHz, 5 GHz, or 6 GHz).

In some embodiments, the environment 100 may not include the WLCs 115-1 and 115-2. In such scenarios, the AP MLDs 110-1, 110-2, and 110-3 may report traffic statistics of the STA MLD 105 directly to the accounting server 120.

Figure 2:
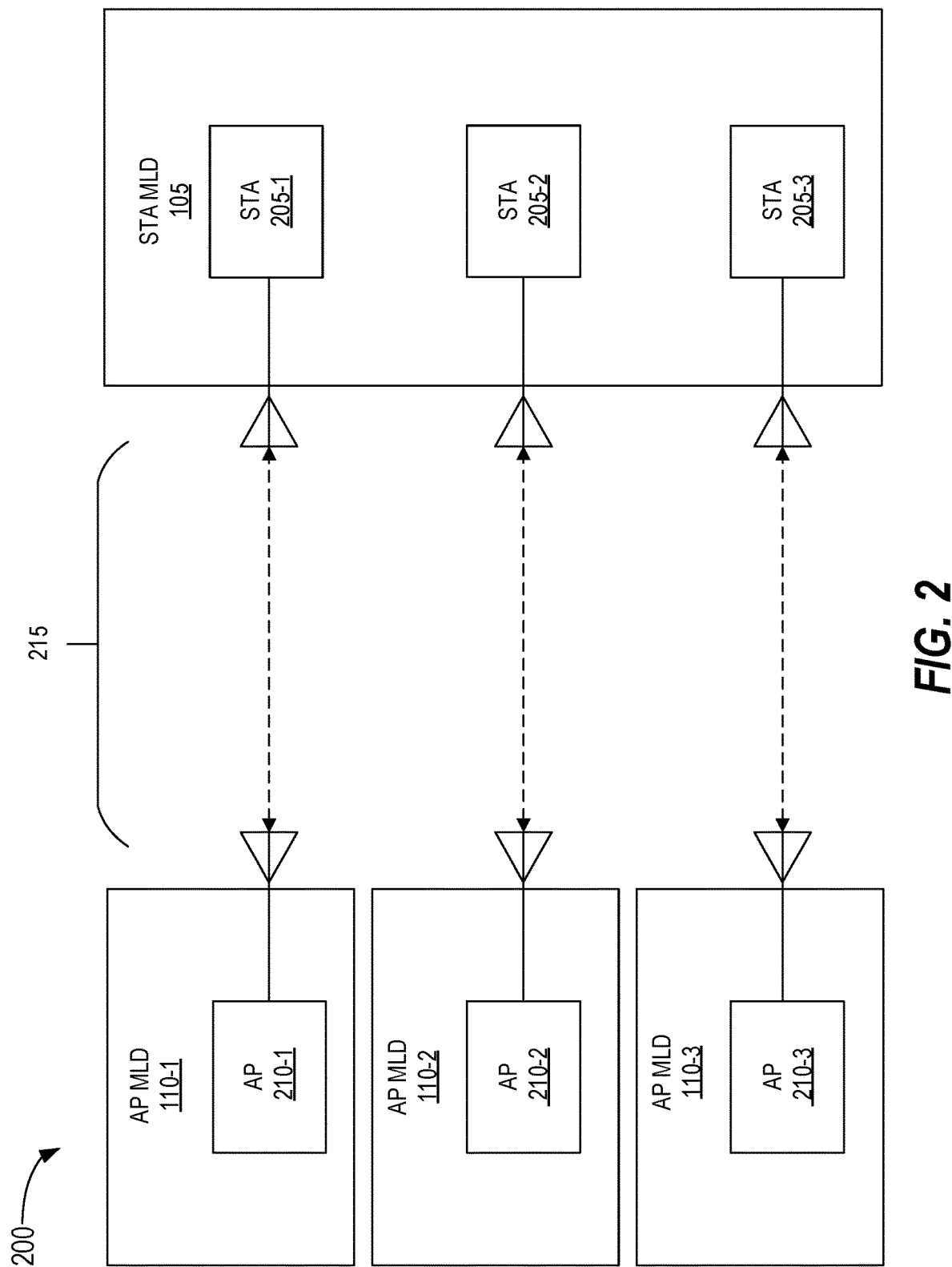
FIG. 2 depicts an example environment for multi-link operation (MLO), according to some embodiments of the present disclosure.

FIG. 2 depicts an example environment 200 for multi-link operation (MLO), according to some embodiments of the present disclosure. In the illustrated environment 200, the STA MLD 105 is communicatively coupled with the AP MLDs 110-1, 110-2, and 110-3 via a set of links 215. Each of the AP MLDs comprises a radio interface. For example, AP MLD 110-1 comprises a radio interface AP 210-1, AP MLD 110-2 comprises a radio interface AP 210-2, and AP MLD 110-3 comprises a radio interface AP 210-3. Each radio interface of the AP MLDs has a unique Basic Service Set Identifier (BSSID) for low-level networking. The STA MLD 105 comprises three radio interfaces, STA 205-1, STA 205-2, and STA 205-3. Each interface of the STA MLD 105 has a unique Medium Access Control (MAC) address for low-level, hardware-based networking. The interfaces STA 205-1, 205-2, and 205-3 of the STA MLD 105 may also share a common virtual MAC address that represents the STA MLD 105 as a single logical device when communicating with other devices in the network.

In some embodiments, the links 215 correspond to wireless connections. In some embodiments, a link (e.g., 215) exists between each antenna of the AP MLDs (e.g., 110-1, 110-2, and 110-3) and each antenna of the STA MLD (e.g., 105). In the illustrated example, links 215 exist between each AP (e.g., 210-1, 210-2, and 210-3) and a corresponding STA (e.g., 205-1, 205-2, and 205-3). For example, the AP 210-1 may have one or more links 215 connecting it to the STA 205-1, each link having a unique link ID. Similarly, the AP 210-2 may have one or more links 215 connecting it to the STA 205-2, each link having a unique link ID, and the AP 210-3 may have one or more links 215 connecting it to the STA 205-3, each link having a unique link ID. In some embodiments, each linked AP/STA pair may operate at a different frequency, as compared to other AP/STA pairs. For example, the AP 210-1 and STA 205-1 may use a first frequency band (e.g., 2.4 GHz), the AP 210-2 and STA 205-2 may use a second band (e.g., 5 GHz), and the AP 210-3 and STA 205-3 may use a third band (e.g., 6 GHz).

The AP MLDs 110-1, 110-2, and 110-3 and the STA MLD 105 are generally representative of any device capable of performing multilink operations. Although three AP MLDs 110-1, 110-2, and 110-3 and one STA MLD 105 are depicted for conceptual clarity, in some embodiments, the MLO may be performed between any MLDs, including multiple AP MLDs, multiple STA MLDs, or any other MLDs. In the illustrated example, the AP MLDs are depicted as each having one radio interface, in some embodiments, the AP MLDs may use any number of APs 210. Similarly, though the STA MLD 105 is depicted as having three radio interfaces (e.g., 205-1, 205-2, and 205-3) in the illustrated example, in some embodiments, the STA MLD 105 may have any number of STAs 205 (including one).

As illustrated, the APs 210 each have one antennas in the illustrated example. In some embodiments, each AP 210 may have any number of antennas. Similarly, though the STAs 205 each have one antenna in the illustrated example, in some embodiments, each STA 205 may have any number of antennas.

Figure 3:
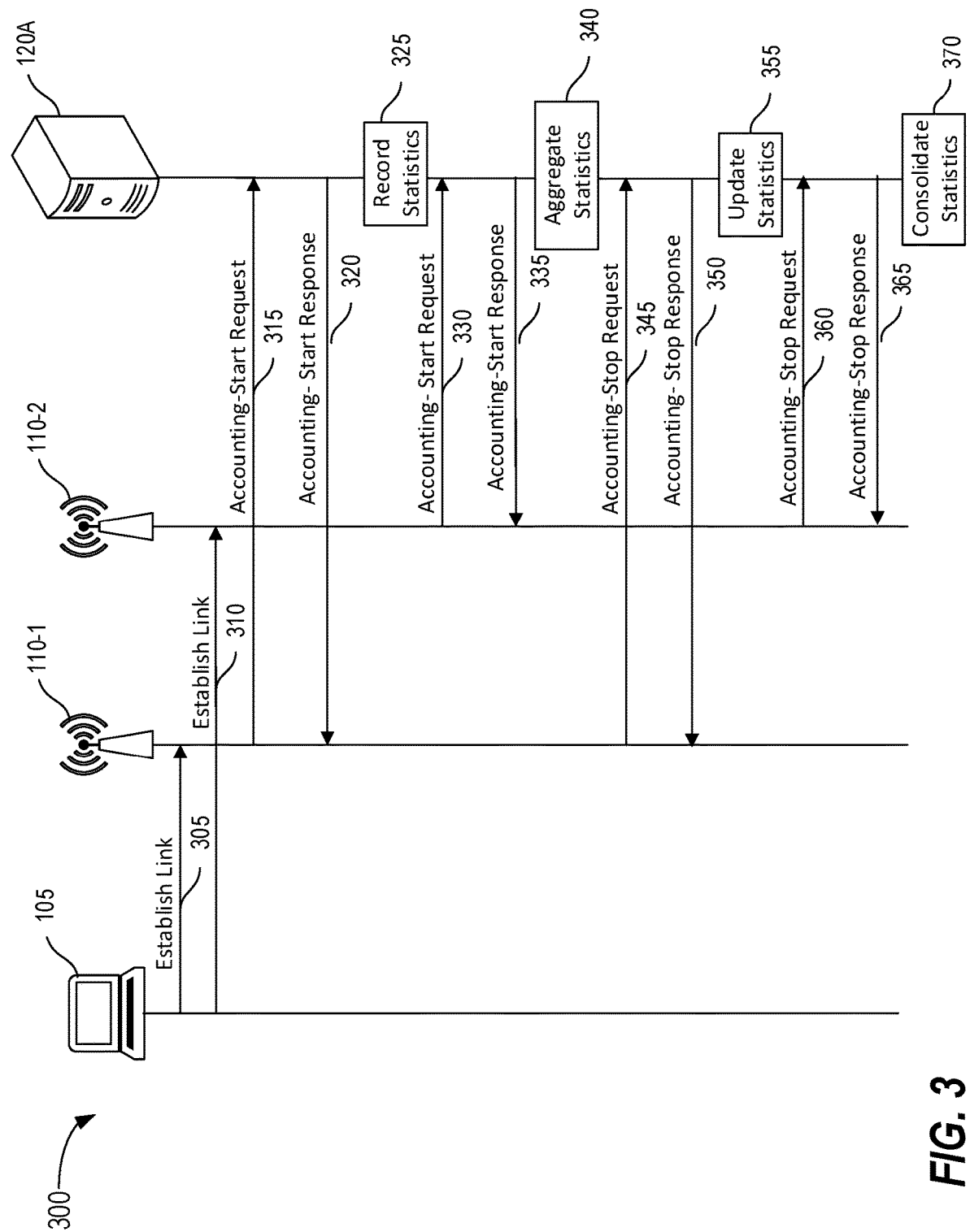
FIG. 3 depicts a time diagram for coordinating traffic statistics between different AP MLDs by an accounting server that supports statistics aggregation, according to some embodiments of the present disclosure.

FIG. 3 depicts a time diagram 300 for coordinating traffic statistics between different AP MLDs 110-1, 110-2 by an accounting server 120A that supports statistics aggregation, according to some embodiments of the present disclosure.

In the illustrated example, the STA MLD 105 establishes a link 305 to the AP MLD 110-1. The established link 305 allows the STA MLD 105 to transmit data to and/or receive data from the network via the AP MLD 110-1. In some embodiments, to establish the link 305, the STA MLD 105 may first search for available AP MLDs within its range. Once the STA MLD 105 identifies the AP MLD 110-1 as the AP it wishes to connect, the STA MLD 105 may send an association request to the AP MLD 110-1, which includes information about the STA MLD 105. The AP MLD 110-1, upon receiving the association request, may decide whether to accept the STA MLD 105 based on a variety of factors, such as the network capacity, the supported data rates, and authorization rules. If the AP MLD 110-1 decides to accept the STA MLD 105, it may send back an association response with an association ID. In some embodiments, depending on the network's security settings, the associated STA MLD 105 and AP MLD 110-1 may further go through an authentication process. Once the association and authentication processes are complete, the link 305 between the STA MLD 105 and AP MLD 110-1 may be established, enabling the STA MLD 105 to communicate with the network via the AP MLD 110-1.

The STA MLD 105 may establish multiple links with different AP MLDs. As illustrated, the STA MLD 105 establish a link 305 to the AP MLD 110-1, and a link 310 to the AP MLD 110-2. The two links allow the STA MLD 105 to transmit and/or receive data through both AP MLDs 110-1 and 110-2 concurrently, enhancing the speed and reliability of data transfer. Although two AP MLDs are depicted as connecting to the STA MLD 105 in the illustrated example, in some embodiments, the STA MLD 105 may connect to any number of AP MLDs (including one) via any number of links (including one). Furthermore, as illustrated, the connected AP MLDs reports the tracked usage statistics for the STA MLD 105 directly to an accounting server (e.g., a RADIUS server). In some embodiments, the connected AP MLDs may report the tracked usage statistics for the STA MLD 105 to the accounting server through one or more controllers (e.g., WLCs).

After the links between STA MLD 105 and AP MLDs 110-1, 110-2 are successfully established, the AP MLDs 110-1, 110-2 may initiate the accounting process by transmitting an accounting-start request to the accounting server 120A. For example, as illustrated, the AP MLD 110-1 sends an accounting-start request 315 to the accounting server 120A when the STA MLD 105 begins using the link 305 to receive and/or transmit data. The request 315 indicates the start of a new accounting session, which is assigned to track the usage statistics of the STA MLD 105. In some embodiments, the request 315 may include a Vendor-Specific Attribute (VSA) defined by the network equipment vendor to indicate that the accounting session is to track statistics for a multi-link device. The VSA may encapsulate various vendor-specific information, such as the address (e.g., MAC address) of the STA MLD 105, and the address (e.g., IP address) of the AP MLD 110-1. This information, which is communicated through the defined VSA, may enable the accounting server 120A to accurately identify, monitor, and record usage statistics of the STA MLD 105 by consolidating data across multiple links reported by different AP MLDs. In some embodiments, the accounting server may allow that each AP MLD initiates its own accounting session for each link it manages with the STA MLD 105. The accounting server may identify and aggregate these statistics across multiple accounting sessions based on a unique identifier, such as the address (e.g., MAC address) of the STA MLD 105.

In the illustrated example, the accounting server 120A, after receiving the accounting-start request 315, sends an accounting-start response 320 to the AP MLD 110-1. In the accounting-start response 320, the accounting server 120A may indicate its capacity for supporting statistics aggregation. In some embodiments, this information that the accounting server 120A supports statistics aggregation may be communicated to the requesting AP MLD using another VSA defined by the network equipment vendor. As illustrated, after sending the accounting-start response 320, the accounting server 120A begins recording the statistics reported by the AP MLD 110-1 (as depicted in block 325). In some embodiments, upon receiving the accounting-start request 315, the accounting server 120A may immediately begin recording the included statistics, and then transmit the accounting-start response 320.

In the illustrated example, the AP MLD 110-2 similarly transmits an accounting-start request 330 when the STA MLD 105 begins using the link 310 to receive and/or transmit data. The accounting-start request 330 indicates the start of a new accounting session, which is assigned by AP MLD 110-2 to track the traffic statistics of the STA MLD 105. In some embodiments, the request 330 may similarly include the VSA, which is defined to indicate that the accounting session is used to track statistics for a multi-link device. The request may further encapsulate various vendor-specific information within the VSA, such as the address (e.g., MAC address) of the STA MLD 105, and the address (e.g., IP address) of the AP MLD 110-2. The accounting server 120A, upon receiving the request 330, sends an accounting-start response 335 to the AP MLD 110-2. The response 335 may indicate that the accounting server 120A supports statistics aggregation, using the same VSA as included in accounting-start response 320.

As illustrated, after sending the accounting-start response 335, the accounting server 120A begins to aggregate the statistics reported by different AP MLDs. For example, the accounting server 120A aggregates the statistics reported by the AP MLD 110-2, with the statistics reported by the AP MLD 110-1 (as depicted in block 340). In some embodiments, the accounting server 120A may identify and track the usage statistics of the STA MLD 105 based on the address (e.g., MAC address) of the STA MLD 105, which is included within each respective accounting-start request (e.g., 315 and 330). In some embodiments, upon receiving the accounting-start request 330, the accounting server 120A may immediately begin to aggregate the included statistics, and then transmit the accounting-start response 335.

In the illustrated example, when the STA MLD 105 stops the data transmission and/or reception via the established link 305, the AP MLD 110-1 initiates the termination of the accounting session by transmitting an accounting-stop request 345 to the accounting server 120A. In some embodiments, the accounting-stop request 345 may indicate the end of data transmission and/or reception for the STA MLD 105 via AP MLD 110-1. In some embodiments, the accounting-stop request 345 may further include the final and cumulative statistics regarding the network usage of the STA MLD 105 as tracked by the AP MLD 110-1 during the accounting session.

Upon receiving the accounting-stop request 345, as shown, the accounting server 120A responds by sending an accounting-stop response 350. In some embodiments, the accounting-stop response 350 may indicate the formal acknowledgement of the termination of the accounting session initiated by AP MLD 110-1 for STA MLD 105, and the reception of the final statistics as tracked AP MLD 110-1 during the accounting session. After sending the accounting-stop response 350, as illustrated, the accounting server 120A updates the traffic statistics it has been tracking for the STA MLD 105 (as depicted in block 355), ensuring that all data related to the network usage of the STA MLD 105 through the link 305 are properly accounted for and up-to-date. In some embodiments, upon receiving the accounting-stop request from the AP MLD 110-1, the accounting server 120A may first update the traffic statistics (as depicted in block 355), and transmit the accounting-stop response 350 after confirming all data related to the link 305 have been properly and accurately updated.

Similarly, in the illustrated example, the AP MLD 110-2 transmits an accounting-stop request 360 to the accounting server 120A upon determining that the STA MLD 105 stops transmitting and/or receiving data via the established link 310. In some embodiments, the accounting-stop request 360 may indicate the end of data transmission and/or reception for the STA MLD 105 via AP MLD 110-2. In some embodiments, the accounting-stop request 360 may further include the final and cumulative statistics regarding the network usage of the STA MLD 105 as tracked by the AP MLD 110-2 during the accounting session. In the illustrated example, the accounting server 120A responds by sending an accounting-stop response 365. In some embodiments, the accounting-stop response 365 may be used to acknowledge the termination of the accounting session initiated by the AP MLD 110-2 for the STA MLD 105, and the reception of the final statistics as tracked AP MLD 110-2 during the accounting session.

In the illustrated example, upon both the AP MLDs 110-1 and 110-2 having ceased their respective accounting sessions for the STA MLD 105, the accounting server proceeds to terminate the tracking activities for the STA MLD 105, and consolidate the statistics for the STA MLD 105 across the links 305 and 310 (as depicted in block 370).

Figure 4:
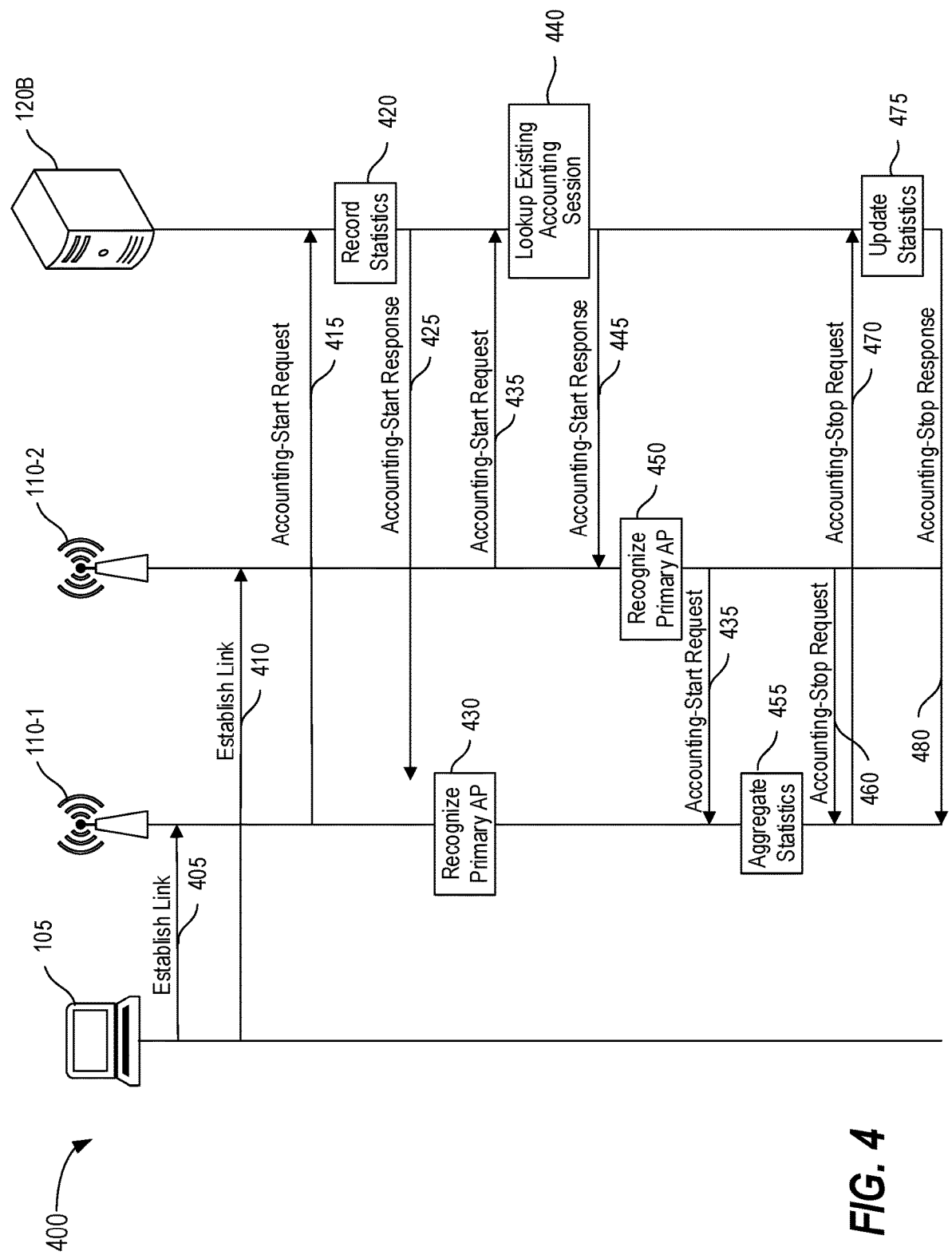
FIG. 4 depicts a time diagram for coordinating traffic statistics between different AP MLDs by a primary AP MLD, according to some embodiments of the present disclosure.

FIG. 4 depicts a time diagram for coordinating traffic statistics between different AP MLDs by a primary AP MLD, according to some embodiments of the present disclosure.

In the illustrated example, the STA MLD 105 establishes a link 405 to the AP MLD 110-1, and a link 410 to the AP MLD 110-2. The established links allow the STA MLD 105 to communicate with the network through both AP MLDs 110-1 and 110-2 concurrently. Although two AP MLDs are depicted as connecting to the STA MLD 105 in the illustrated example, in some embodiments, the STA MLD 105 may connect to any number of AP MLDs (including one) via any number of links (including one). Furthermore, as illustrated, the connected AP MLDs reports the tracked usage statistics for the STA MLD 105 directly to an accounting server 120B (e.g., a RADIUS server). In some embodiments, the connected AP MLDs may report the tracked usage statistics for the STA MLD 105 to the accounting server 120B through one or more controllers (e.g., WLCs).

In the illustrated example, the AP MLD 110-1 sends an accounting-start request 415 to the accounting server 120B, when the STA MLD 105 begins using the link 405 to receive and/or transmit data. The request 415 may indicate that the AP MLD 110-1 starts a new accounting session to track the usage statistics for a multi-link device. In some embodiments, the indicating may be communicated using a new VSA defined by the network equipment vendor. In some embodiments, the accounting-start request 415 may also include the address (e.g., MAC address) of the STA MLD 105, and the address (e.g., IP address) of the AP MLD 110-1, all encapsulated with the VSA and transmitted to the accounting server 120B (e.g., using the standard RADIUS protocol).

The accounting server 120B, upon receiving the accounting-start request 415, may first conduct a check to determine if an active accounting session has already been initiated for the STA MLD 105. The check may be performed based on the MAC address of the STA MLD 105. If the accounting server 120B determines that there is no active accounting session for the STA MLD 105, as illustrated, the accounting server 120B starts a new accounting session and begins to record the traffic statistics reported by the AP MLD 110-1 (as depicted in block 420). The accounting server 120B further generates an accounting-start response 425, designating the AP MLD 110-1 as the primary AP. The primary AP is responsible for aggregating statistics reported by other AP MLDs connected to the same STA MLD. In the illustrated example, the STA MLD 105 is connected to two AP MLDs, and the AP 110-1, as the primary AP, is responsible for aggregating statistics reported by AP MLD 110-2 with the statistics it tracks. In some embodiments, the accounting-start response 425 may also include the address (e.g., IP address) of the AP MLD 110-1 to facilitate identification. In some embodiments, the indication that the accounting server does not support statistics aggregation but designate another AP MLD as the primary AP to perform such aggregation operations may be communicated using another VSA defined by the network equipment vendor, along with other vendor-specific information, such as the address (e.g., IP address) of the designated primary AP.

In the illustrated example, upon receiving the accounting-start response 425, the AP MLD 110-1 recognizes itself as the primary AP (e.g., based on the included IP address) (as depicted in block 430).

In the illustrated example, the AP MLD 110-2 transmits an accounting-start request 435 to the accounting server 120B, upon determining that STA MLD 105 begins using the link 410 to receive and/or transmit data. The accounting server 120B runs another check and determines that an active accounting session has been initiated for the STA MLD 105 (by AP MLD 110-1), and the AP MLD 110-1 has been designated as the primary AP (as depicted in block 440). The accounting server 120B then transmits an accounting-start response 445 to the AP MLD 110-2. In some embodiments, the accounting-start response 445 may indicate that the accounting server does not support statistics aggregation but designate another AP MLD as the primary AP to perform such aggregation operations, using the same VSA as included in accounting-start response 425. The accounting-start response 445 may also encapsulate the address (e.g., IP address) of the AP MLD 110-1 for further identification.

In the illustrated example, the AP MLD 110-2 uses the included address (e.g., IP address) to recognize the primary AP (as depicted in block 450), and forward its accounting-start request 435 to the primary AP.

In the illustrated example, the primary AP (AP MLD 110-1), upon receiving the accounting-start request 435 from the secondary AP (AP MLD 110-2), begins aggregating statistics reported by AP MLD 110-2 with the statistics it has been tracking for STA MLD 105 (as depicted in block 455). The primary AP (AP MLD 110-1) continues to update traffic statistics, including when it receives an accounting-stop request 460 from the secondary AP (AP MLD 110-2). Upon determining that the transmission and/or reception of data across all established links (e.g., 405 and 410) have ceased, the primary AP (AP MLD 110-1) proceeds to perform a final consolidation of the statistics tracked by different AP MLDs, and transmits an accounting-stop request 470 to the accounting server 120B. In some embodiments, the request 470 may contain the consolidated statistics tracked by different AP MLDs, and indicate the end of data transmission and/or reception for the STA MLD 105 across all links.

In the illustrated example, upon receiving the accounting-stop request 470 from the primary AP (the AP MLD 110-1), the accounting server 120B updates the statistics it has been tracking for the STA MLD 105 (as depicted in block 475). The update is based on the consolidated statistics reported by the primary AP (AP MLD 110-1). Following the update, the accounting server 120B terminates the accounting session for the STA MLD 105, and transmits an accounting-stop response 480 to the primary AP, acknowledging the reception of the consolidated statistics and instructing the primary AP to end its tracking operations.

Figure 5:
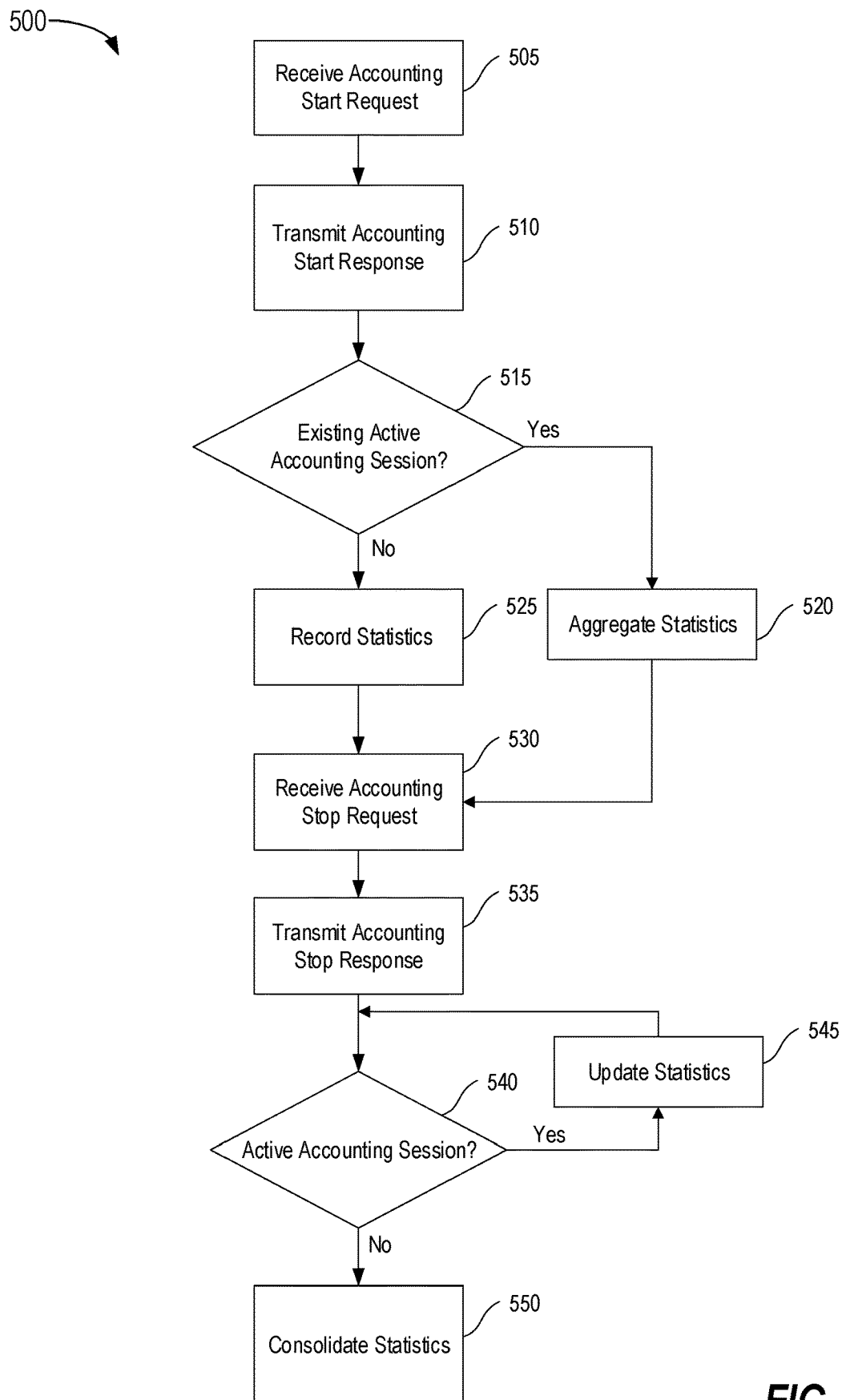
FIG. 5 depicts an example method for managing accounting sessions and coordinating traffic statistics reported by different AP MLDs by an accounting server that supports statistics aggregation, according to some embodiments of the present disclosure.

FIG. 5 depicts an example method 500 for managing accounting sessions and coordinating traffic statistics reported by different AP MLDs by an accounting server that supports statistics aggregation, according to some embodiments of the present disclosure. In some embodiments, the method 500 may be performed by an accounting server that supports statistics aggregation, such as the accounting server 120A of FIG. 3.

At block 505, an accounting server (e.g., 120A of FIG. 3) receives an accounting-start request (e.g., 315 or 330 of FIG. 3) from an AP MLD. In one embodiment, the accounting-start request may indicate that the requesting AP MLD starts a new accounting session to track the traffic statistics of a non-AP MLD (e.g., STA MLD 105 of FIG. 3). In some embodiments, the indication may be encapsulated within a VSA, along with other vendor-specific information, such as the address (e.g., MAC address) of the non-AP MLD (e.g., STA MLD 105 of FIG. 3), and the address (e.g., IP address) of the requesting AP MLD (e.g., AP MLDs 110-1 or 110-2 of FIG. 3).

At block 510, the accounting server (e.g., 120A of FIG. 3) transmits an accounting-start response (e.g., 320 or 350 of FIG. 3) to the requesting AP MLD (e.g., AP MLDs 110-1 or 110-2 of FIG. 3). In one embodiment, the accounting-start response (e.g., 320 or 350 of FIG. 3) may indicate the accounting server's capability of aggregating statistics across multiple links. In some embodiments, this indication may be communicated to the requesting AP MLD using a VSA defined by the network equipment vendor.

At block 515, the accounting server (e.g., 120A of FIG. 3) checks to determine if an active accounting session has already been initiated for the specific non-AP MLD (e.g., STA MLD 105 of FIG. 3). If the accounting server determines that no active accounting session exists, the method 500 proceeds to block 525, where the accounting server begins to record the traffic statistics reported by the requesting AP MLD (as depicted in block 325 of FIG. 3). If the accounting server determines that one or more active accounting sessions have already been initiated for the non-AP MLD (e.g., STA MLD 105 of FIG. 3) by one or more other AP MLDs, the method 500 proceeds to block 520, where the accounting server aggregates the statistics reported by the requesting AP MLD during its accounting session, with the statistics reported by other AP MLDs (as depicted in 340 of FIG. 3) during their respective accounting sessions. In some embodiments, the accounting server identifies the active accounting sessions initiated by different AP MLDs (e.g., 110-1 and 110-2 of FIG. 3) for the same non-AP MLD (e.g., 105 of FIG. 3) by checking the MAC address of the non-AP MLD in each respective accounting-start request (e.g., 315 or 330 of FIG. 3).

At block 530, the accounting server receives an accounting-stop request (e.g., 330 or 360 of FIG. 3) from the requesting AP MLD (e.g., 110-1 or 110-2 of FIG. 3). In one embodiment, the accounting-stop request may indicate the end of data transmission and/or reception for the non-AP STA through the requesting AP MLD. In one embodiment, the accounting-stop request may further provide the final and cumulative statistics regarding the network usage of the specific non-AP MLD (e.g., STA MLD 105 of FIG. 3) during the accounting session, as tracked by the requesting AP MLD. The statistics may include the amount of data transmitted and received, duration of the session, and other relevant usage data, allowing the accounting server to conclude the accounting process for this particular session accurately.

At block 535, the accounting server transmits an accounting-stop response (e.g., 350 or 365 of FIG. 3) to the requesting AP MLD, acknowledging the termination of the accounting session initiated by requesting AP MLD for the specific non-AP MLD, and the reception of the final statistic as tracked by the requesting AP MLD.

At block 540, the accounting server determines if there are other active accounting sessions continuing to track the specific non-AP MLD's network usage (meaning there are any other AP MLDs actively transmitting and/or receiving data on behalf of the non-AP MLD). If there are other active sessions, the method 500 proceeds to block 545, where the accounting server updates the traffic statistics it has been tracking for the specific non-AP MLD based on the data reported by the requesting AP MLD (as depicted in block 355 of FIG. 3). If there are no other active sessions (meaning that there are no other AP MLDs actively transmitting and/or receiving data on behalf of the specific non-AP MLD), the method 500 proceeds to block 550, where the accounting server terminates the tracking activities for the specific non-AP STA, and consolidates the statistics for the specific non-AP STA across all relevant links (as depicted in block 370 of FIG. 3). In some embodiments, after the tracking activities for the specific non-AP STA are terminated, the accounting server may proceed to generate an accounting report for the specific non-AP STA. The report may provide a detailed summary of the network usage of the specific non-AP STA during its active sessions. In some embodiments, the report may include the total amount of data transmitted and/or received on behalf of the specific non-AP STA, the duration of each session, the AP MLDs (e.g., 110-1 and 110-2) that the specific non-AP STA connected to, and other relevant details.

In some embodiments, statistics for a specific STA MLD on different links may be managed in a single, shared accounting session. In some embodiments, each AP MLD may initiate its own accounting session for each link it manages with the STA MLD. In some embodiments, the accounting server may aggregate these statistics across different sessions based on a unique identifier. For example, in some embodiments, the accounting server may maintain detailed usage statistics for the STA MLD based on the address (e.g., MAC address) of the STA MLD. In some embodiments, when a client owns multiple STA MLDs, the accounting server may maintain detailed usage statistics for the client based on the addresses (e.g., MAC address) of these STA MLDs and a unique identifier of the client (e.g., client ID). In some embodiments, when a AP MLD connects to multiple STA MLDs via multiple links, the server may maintain detailed usage statistics for a specific STA MLD as tracked by the AP MLD based on the address (e.g., IP address) of the AP MLD, as well as the address (e.g., MAC address) of the specific STA MLD. In some embodiments, when multiple STA MLDs connecting to multiple AP MLDs belong to the same of technology, the accounting server may maintain detailed usage statistics for this type of technology based on the addresses (e.g., MAC address) of these STA MLDs and a unique identifier for this technology.

Figure 6:
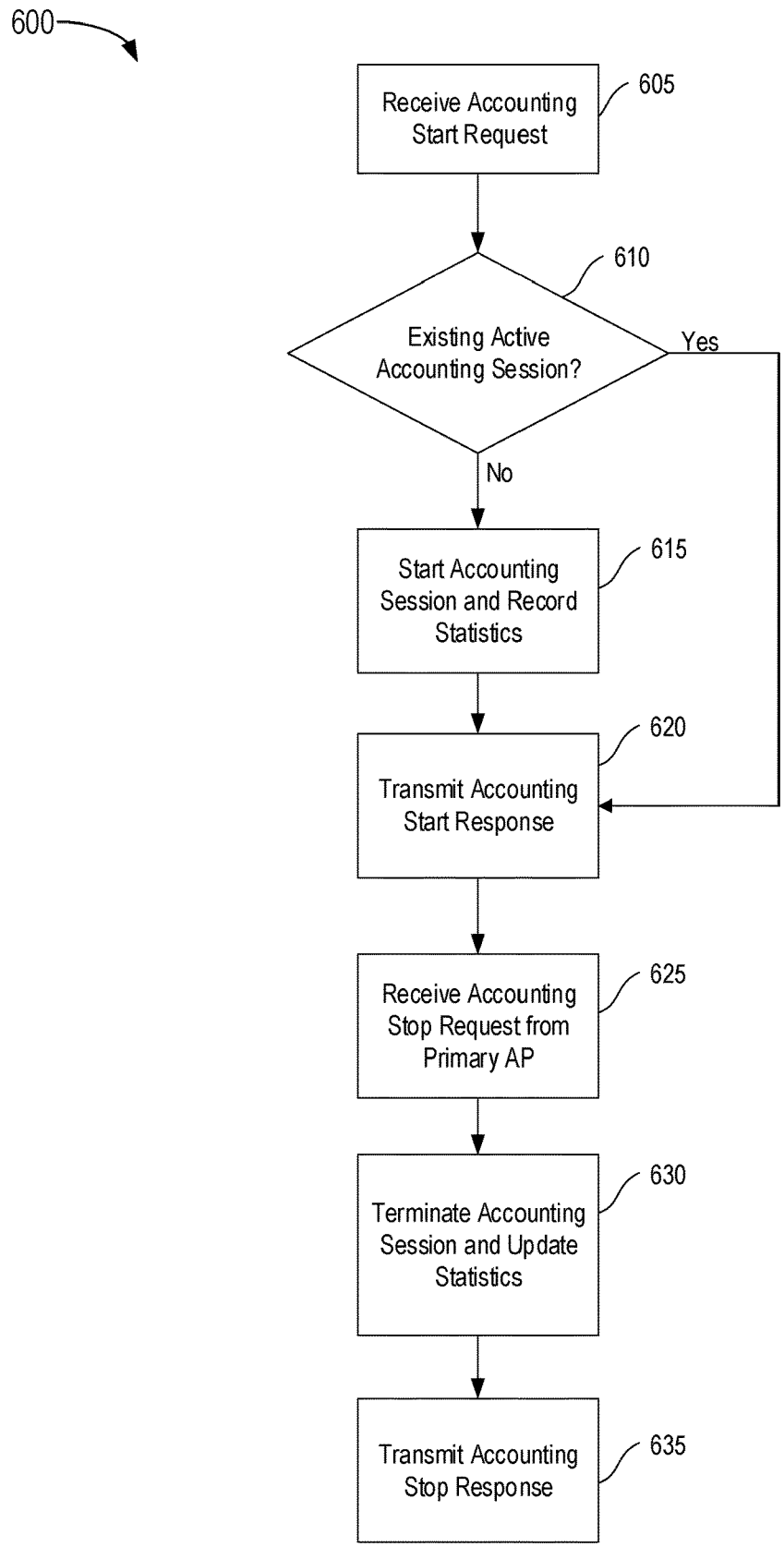
FIG. 6 depicts an example method for managing accounting sessions and coordinating traffic statistics reported by different AP MLDs by an accounting server that does not support statistics aggregation, according to some embodiments of the present disclosure.

FIG. 6 depicts an example method 600 for managing accounting sessions and coordinating traffic statistics reported by different AP MLDs by an accounting server that does not support statistics aggregation, according to some embodiments of the present disclosure. In some embodiments, the method 600 may be performed by an accounting server that does not support statistics aggregation, such as the accounting server 120B of FIG. 4.

At block 605, an accounting server (e.g., 120B of FIG. 4) receives an accounting start request (e.g., 415 or 435 of FIG. 4) from an AP MLD (e.g., 110-1, or 110-2 of FIG. 4). The AP MLD is connected to a specific non-AP MLD (e.g., 105 of FIG. 4) via a link, and transmits and/or receives data on behalf of the specific non-AP MLD. In one embodiment, the accounting-start request may indicate that the requesting AP MLD starts a new accounting session to track the non-AP MLD's network activity. In some embodiments, as discussed above, this indication is communicated using a VSA, along with other vendor-specific information, such as the address (e.g., MAC address) of the specific non-AP MLD (e.g., STA MLD 105 of FIG. 4), and the address (e.g., IP address) of the requesting AP MLD (e.g., AP MLDs 110-1 or 110-2 of FIG. 4).

At block 610, the accounting server runs a check to determine if an active accounting session has already been initiated for the specific non-AP MLD (e.g., STA MLD 105 of FIG. 4). In one embodiment, the address (e.g., MAC address) of the non-AP MLD contained in each accounting-start request (e.g., 415 or 435 of FIG. 4) is used to identify the existing active accounting sessions for the specific non-AP MLD. If the accounting server (e.g., 120B of FIG. 4) determines that no active accounting session exists, the method 600 proceeds to block 615, where the accounting server starts a new accounting session, and begins recording the traffic statistics reported by the requesting AP MLD (as depicted in block 420 of FIG. 4). After the new accounting session has been created and the traffic statistics reported by the requesting AP MLD have been properly recorded, the method 600 then moves to block 620, where the accounting server transmits an accounting-start response (e.g., 425 of FIG. 4), designating the requesting AP MLD (e.g., 110-1 of FIG. 4) as the primary AP, and including the address (e.g., IP address) of the primary AP. In some embodiments, the accounting-start response may include a VSA defined by the network equipment vendor to indicate the accounting server's inability to aggregate statistics. The information, such as the designation of the requesting AP MLD as the primary AP, and the address of the primary AP, may be encapsulated with the VSA as vendor-specific information, and transmitted to the requesting AP MLD (e.g., using the standard RADIUS protocol).

If the accounting server (e.g., 120B of FIG. 4) determines that one or more active accounting sessions have already been initiated for the non-AP MLD (e.g., STA MLD 105 of FIG. 4) by one or more other AP MLDs (e.g., 110-1 of FIG. 4), and one of the other AP MLDs has been designated as the primary AP (as depicted in block 440 of FIG. 4), the method 600 then skips the block 615, and proceeds directly to block 620, where the accounting server transmits an accounting-start response (e.g., 440 of FIG. 4) to the requesting AP MLD (e.g., 110-2 of FIG. 4), indicating that one of the other AP MLDs (e.g., 110-1 of FIG. 4) has been designated as the primary AP, and including the address (e.g., IP address) of the primary AP.

At block 625, the accounting server (e.g., 120B of FIG. 4) receives an accounting-stop request (e.g., 470 of FIG. 4) from the primary AP (e.g., 110-1 of FIG. 4). In some embodiments, the accounting-stop request from the primary AP may indicate that data transmission and/or reception for the specific non-AP MLD have terminated across all links through different AP MLDs. In some embodiments, the accounting-stop request from the primary AP may include a final consolidation of the statistics regarding the network usage of the specific non-AP MLD across all links (tracked by different AP MLDs) during the accounting session.

At block 630, the accounting server (e.g., 120B of FIG. 4) updates the statistics it has been tracking for the specific non-AP MLD (e.g., 105 of FIG. 4) based on the consolidated data reported by the primary AP (e.g., 110-1 of FIG. 4), and terminates the accounting session (as depicted in block 475 of FIG. 4). At block 635, the accounting server transmits an accounting-stop response (e.g., 480 of FIG. 4) to the primary AP. In some embodiments, the accounting-stop response may include an acknowledgment regarding the reception of the consolidated statistics from the primary AP, as well as an instruction to the primary AP to terminate its tracking operation.

Figure 7:
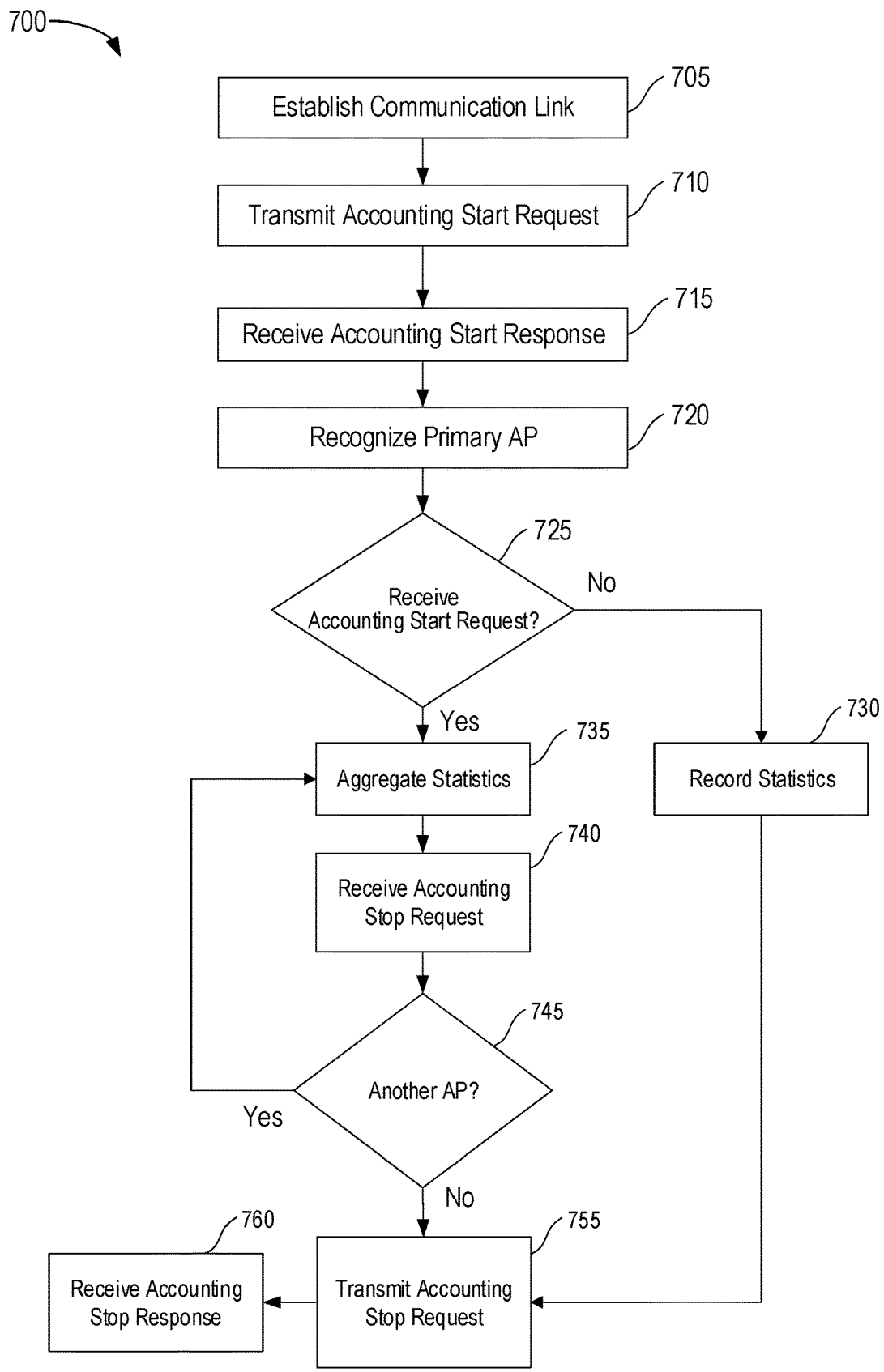
FIG. 7 depicts an example method for coordinating and reporting traffic statistics by a primary AP MLD, according to some embodiments of the present disclosure.

FIG. 7 depicts an example method 700 for coordinating and reporting traffic statistics by a primary AP MLD, according to some embodiments of the present disclosure. In some embodiments, the method 700 may be performed by an AP MLD (or a WLC) that is designated by the accounting server as the primary AP (or the primary controller), such as the AP MLD 110-1 of FIG. 4, or the WLC 115-1 or 115-2 of FIG. 1.

At block 705, an AP MLD (or a WLC) (e.g., 110-1 of FIG. 4) establishes a communication link (e.g., 405 of FIG. 4) to a specific non-AP MLD (e.g., 105 of FIG. 4). The communication link allows the non-AP MLD to communicate with the network via the connected AP MLD.

At block 710, the AP MLD (or the WLC) transmits an accounting-start request (e.g., 415 of FIG. 4) to the accounting server (e.g., 120B of FIG. 4). As stated above, in some embodiments, the accounting-start request may include a VSA to indicate that the requesting AP MLD starts a new accounting session to track the network usage of the specific non-AP MLD, along with various vendor-specific information, such as the address (e.g., MAC address) of the specific non-AP MLD, and the address (e.g., IP address) of the requesting AP MLD.

At block 715, the AP MLD (or the WLC) receives an accounting-start response (e.g., 425 of FIG. 4) from the accounting server. As discussed above, the accounting-start response may indicate that the requesting AP MLD has been designated by the accounting server as the primary AP, and is responsible for aggregating statistics reported by other AP MLDs for the same non-AP MLD. In some embodiments, the accounting-start response may also include the address (e.g., IP address) of the primary AP to facilitate identification. In some embodiments, as discussed above, the indication is communicated using another VSA defined by the network equipment vendor, along with various encapsulated vendor-specific information, such as the address (e.g., IP address) of the primary AP.

At block 720, the AP MLD (or the WLC) recognizes itself as the primary AP based on the address included in the accounting-start response (as depicted in block 430 of FIG. 4). At block 725, the AP MLD (or a controller) examines if it has received any accounting-start requests from other AP MLDs (secondary AP MLDs). If there are no such requests (which implies that no other AP MLDs are actively involved in transmitting and/or receiving data for the specific non-AP MLD except the primary AP), the method 700 proceeds to block 730, where the AP MLD (or the WLC) maintains a record of the statistics it tracked for the non-AP MLD. Once the data transmission and reception on the AP MLD ceases, the method 700 moves directly to block 755, where the AP MLD sends an accounting-stop request to the accounting server, reporting the final and cumulative statistics it has been tracking for the non-AP MLD during the accounting session, and announcing the termination of data transmission on behalf of the specific non-AP MLD.

If there are accounting-start requests received from other AP MLDs (secondary AP MLDs), the method 700 proceeds to block 735, where the requesting AP MLD, as the primary AP, aggregates these statistics from secondary AP MLDs along with its own tracked statistics (as depicted in block 455 of FIG. 4). At block 740, the AP MLD (or the WLC) receives an accounting-stop request from one of the secondary AP MLDs, indicating the end of data transmission and/or reception for the specific non-AP STA on that particular secondary AP MLD. At block 745, the AP MLD (or the WLC) determines if there are other secondary AP MLDs still actively transmitting and/or receiving data on behalf of the non-AP MLD. If the answer is yes, the method 700 returns to block 735, where the AP MLD (or the controller) continues to collect and aggregate the statistics reported by the remaining active AP MLDs (as depicted in block 455 of FIG. 4). If the answer is no, which suggests that all AP MLDs (including both secondary AP MLDs and the primary AP MLD) have stopped data transmission for the non-AP STA, the method 700 moves to block 755, where the AP MLD (or the WLC) sends an accounting-stop request (e.g., 470 of FIG. 4) to the accounting server. In some embodiments, this request, as stated above, may include a final consolidation of the statistics regarding the network usage of the specific non-AP MLD reported by all different AP MLDs during the accounting session. In some embodiments, the request may also indicate the termination of data transmission and/or reception across all links connecting to the specific non-AP MLD, effectively ending the accounting session.

At block 760, the AP MLD (or the WLC) receives an accounting-stop response (e.g., 480 of FIG. 4) from the accounting server. In some embodiments, as discussed above, the accounting-stop response may include an acknowledgment regarding the reception of the consolidated statistics from the primary AP, as well as an instruction to the primary AP to terminate its tracking operations.

Figure 8:
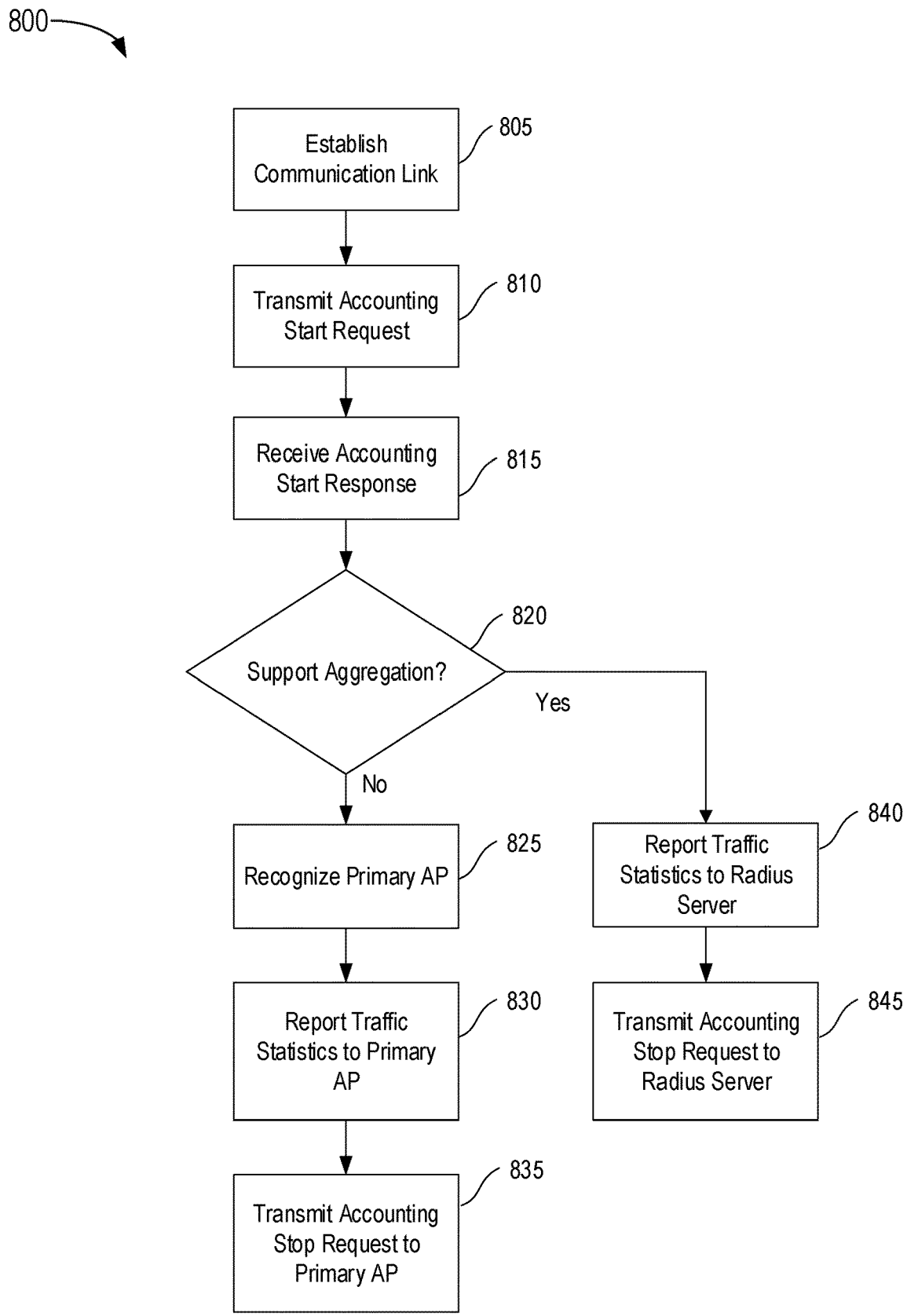
FIG. 8 depicts an example method for coordinating and reporting traffic statistics by a secondary AP MLD, according to some embodiments of the present disclosure.

FIG. 8 depicts an example method 800 for coordinating and reporting traffic statistics by a secondary AP MLD, according to some embodiments of the present disclosure. In some embodiments, the method 800 may be performed by an AP MLD (or a WLC) that is designated by the accounting server as the secondary AP (or the secondary controller), such as the AP MLD 110-2 of FIG. 4, or the WLC 115-1 or 115-2 of FIG. 1. In some embodiments, the method 800 may be performed by an AP MLD (or a WLC) that reports to an accounting server supporting statistics aggregation, such as the AP MLDs 110-1 and 110-2 of FIG. 3, or the WLC 115-1 or 115-2 of FIG. 1.

At block 805, a AP MLD (or a WLC) established a communication link (e.g., 305 or 310 of FIG. 3, or 410 of FIG. 4,) to a specific non-AP MLD (e.g., 105 of FIG. 3, or 105 of FIG. 4). The communication link allows the non-AP MLD to communicate with the network via the connected AP MLD.

At block 810, the AP MLD (or the controller) transmits an accounting-start request (e.g., 315 or 330 of FIG. 3, or 435 of FIG. 4) to the accounting server (e.g., 120A of FIG. 3, or 102B of FIG. 4). As discussed above, the accounting-start request may include various information, such as an indication that a new accounting session for the non-AP STA has been initiated by the requesting AP MLD, the address (e.g., MAC address) of the specific non-AP MLD, as well as the address (e.g., IP address) of the requesting AP MLD. In some embodiments, the aforementioned information within the accounting-start request may be encapsulated with a new defined VSA, and communicated to the accounting server (e.g., using the standard RADIUS protocol).

At block 815, the AP MLD (or the WLC) receives an accounting-start response (e.g., 320 or 335 of FIG. 3, or 445 of FIG. 4) from the accounting server (e.g., 120A of FIG. 3, or 102B of FIG. 4). In some embodiments, the accounting-start response may reveal whether the accounting server is capable of aggregating statistics received from different AP MLDs. In some embodiments, the accounting-start response may use one defined VSA to indicate its ability to aggregate statistics, and a different VSA to indicate its inability to perform such aggregation, thereby designating an AP MLD as the primary equipment to execute aggregation tasks. In some embodiments, the accounting-start response indicating the server's inability to aggregate statistics may further include the address (e.g., IP address) of the designated primary AP MLD.

At block 820, the AP MLD (or the WLC) determines whether the accounting server supports aggregation based on the received accounting-start response (e.g., 320 or 335 of FIG. 3, or 445 of FIG. 4). If it is determined that the accounting server (e.g., 120B of FIG. 4) does not support statistics aggregation, the method 800 proceeds to block 825, where the AP MLD (or the WLC) (e.g., 110-2 of FIG. 4) identifies the primary AP (e.g., 110-1 of FIG. 4) based on the included address (e.g., IP address). At block 830, the AP MLD (or the controller) reports its tracked statistics for the specific non-AP MLD to the primary AP. At block 835, the AP MLD (or the WLC) transmits an accounting stop request to the primary AP, upon determining that the data transmission and/or reception for the specific non-AP MLD on the requesting AP MLD (or the WLC) has ceased.

If it is determined that the accounting server (e.g., 120A of FIG. 3) supports statistics aggregation, the method 800 proceeds to block 840, where the AP MLD (or the WLC) (e.g., 110-1 or 110-2 of FIG. 3) reports its tracked statistics directly to the accounting server. At block 845, the AP MLD (or the WLC) transmits an accounting stop request to the accounting server, upon determining that the data transmission and/or reception for the specific non-AP MLD on the requesting AP MLD (or WLC) has ended.

Figure 9:
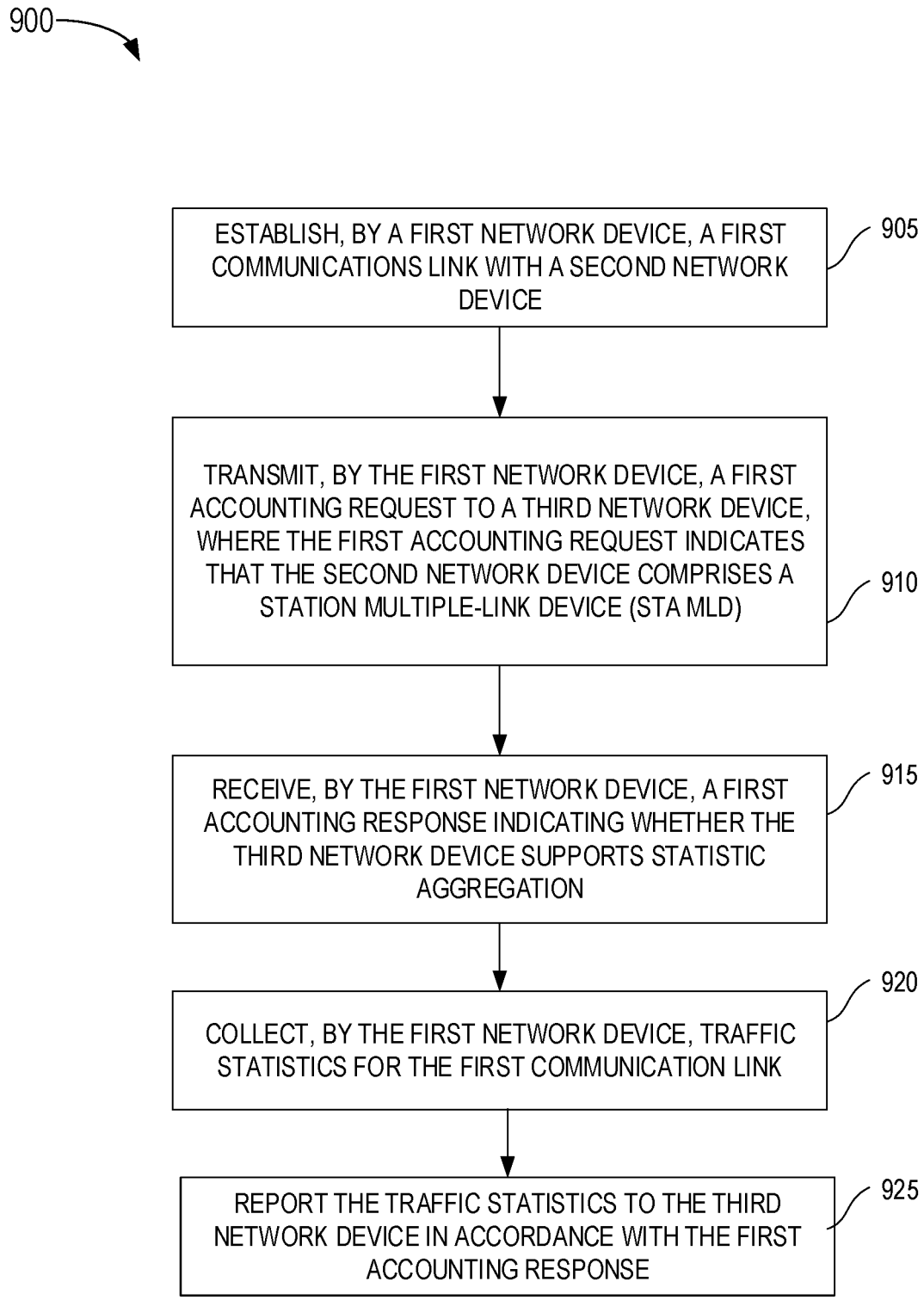
FIG. 9 is a flow diagram depicting an example method for traffic statistics coordination, according to some embodiments of the present disclosure.

FIG. 9 is a flow diagram depicting an example method for traffic statistics coordination, according to some embodiments of the present disclosure.

At block 905, a first network device establishes a first communication link with a second network device (e.g., STA MLD 105 of FIGS. 1, 2, 3 and 4). In some embodiments, the first network device comprises one of an access point (AP) (e.g., AP MLDs 110-1, 110-2, and 110-3 of FIG. 1, AP MLDs 110-1, 110-2, and 110-3 of FIG. 2, AP MLDs 110-1, and 110-2 of FIG. 3, AP MLDs 110-1, and 110-2 of FIG. 4), or a wireless local area network (LAN) controller (WLC) (e.g., WLCs 115-1, and 115-2 of FIG. 1).

At block 910, the first network device transmits a first accounting request (e.g., 315 or 330 of FIG. 3, 415 or 435 of FIG. 4) to a third network device (e.g., accounting server 120 of FIG. 1, accounting server 120A of FIG. 3, or accounting server 120B of FIG. 4). The first accounting request indicates that the second network device comprises a station multi-link device (STA MLD). In some embodiments, the STA MLD may be any type of devices that can connect to a local wireless network through one or more APs, including but not limited to traditional computing devices such as desktop computers, laptops, servers, tablets, smartphones and wearable devices, as well as a growing number of Internet of Things (IoT) devices such as smart home devices, fitness trackers, industrial sensors, and the like. In some embodiments, the third network device tracks the traffic statistics for the second network device on a per-link basis.

At block 915, the first network device receives a first accounting response (e.g., 320 or 335 of FIG. 3, or 425 or 445 of FIG. 4), indicating whether the third network device supports statistic aggregation. In some embodiments, the first accounting response (e.g., 320 or 335 of FIG. 3) indicates that the third network device supports statistics aggregation. Under such circumstances, the third network device aggregates the traffic statistics received from the first network device (e.g., 110-1 of FIG. 3) with traffic statistics received from one or more network devices (e.g., 110-2 of FIG. 3). Each of the one or more network devices connects to the second network device via a respective communication link (e.g., links 215 of FIG. 2). In some embodiments, the first accounting response (e.g., 425 of FIG. 4) indicates that the third network device does not support statistics aggregation, and that the first network device (e.g., 110-1 of FIG. 4) is a primary network device. As such, in some embodiments, the first network device (e.g., 110-1 of FIG. 4) may aggregate traffic statistics received from one or more other network devices (e.g., 110-2 of FIG. 4), and transmit the aggregated traffic statistics to the third network device. In some embodiments, the first accounting response (e.g., 445 of FIG. 4) indicates that the third network device does not support statistics aggregation, and that a fourth network device (e.g., 110-1 of FIG. 4) is a primary network device. As such, in some embodiments, the first network device (e.g., 110-2 of FIG. 4) may transmit the traffic statistics to the forth network device, where the fourth network device (e.g., 110-1 of FIG. 4) connects to the second network device via a second communication link (e.g., 405 of FIG. 4), aggregates the traffic statistics for the second communication link with the traffic statistics received from the first network device for the first communication link (e.g., 410 of FIG. 4), and reports the aggregated traffic statistics to the third network device (e.g., 120B of FIG. 4). In some embodiments, the first accounting response (e.g., 445 of FIG. 4) indicating that the fourth network device (e.g., 110-1 of FIG. 4) is the primary network device was transmitted by the third network device (e.g., 120B of FIG. 4) in response to determining that an accounting session for the second network device (e.g., 105 of FIG. 4) was already established by the fourth network device (e.g., 110-1 of FIG. 4) to track traffic statistics for a second communication link (e.g., 405 of FIG. 4) between the second and fourth network devices.

At block 920, the first network device collects traffic statistics for the first communication link.

At block 925, the first network device reports the traffic statistics to the third network device in accordance with the first accounting response.

Figure 10:
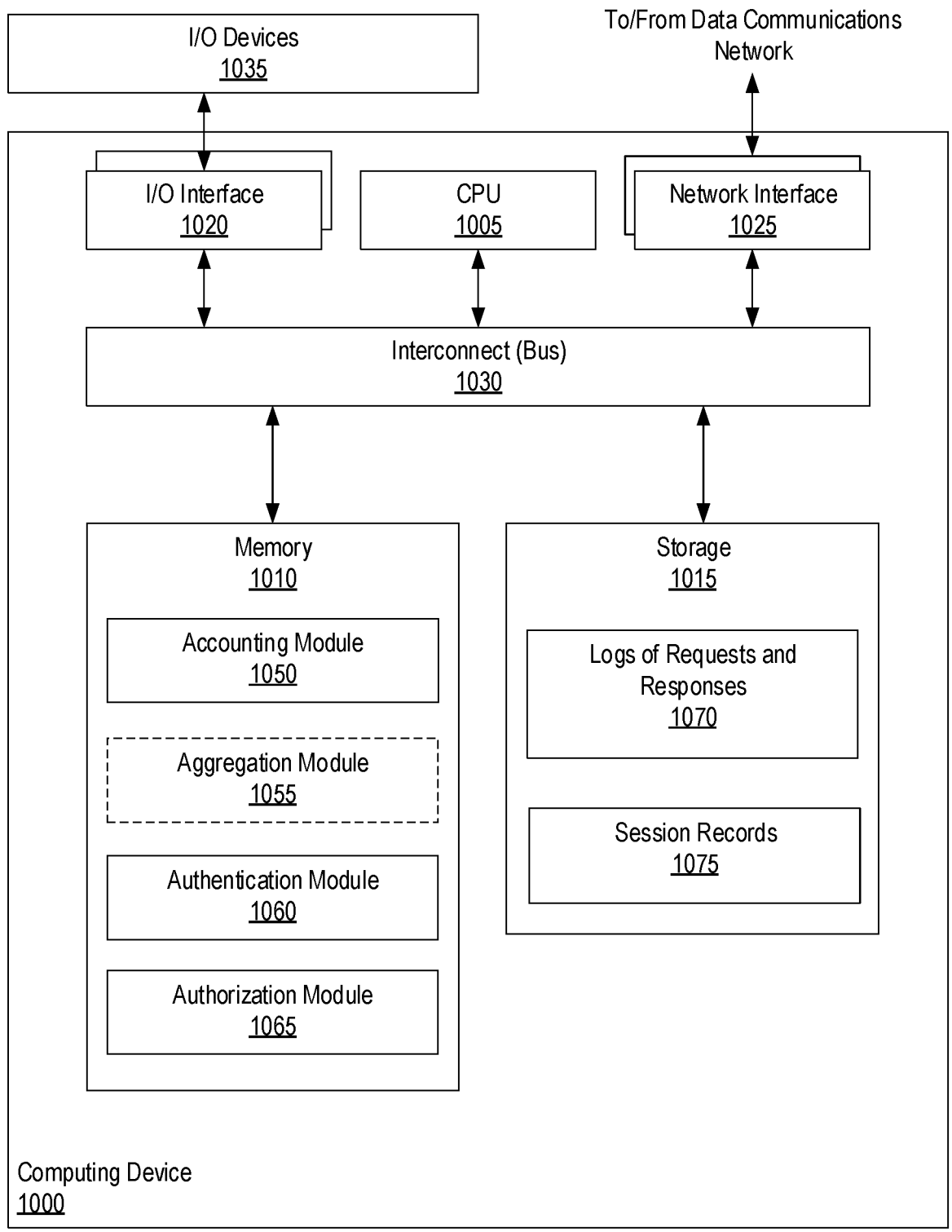
FIG. 10 depicts an example computing device configured to perform various aspects of the present disclosure, according to one embodiment.

FIG. 10 depicts an example computing device 1000 configured to perform various aspects of the present disclosure, according to one embodiment. Although depicted as a physical device, in embodiments, the computing device 1000 may be implemented using virtual device(s), and/or across a number of devices (e.g., in a cloud environment). In one embodiment, the computing device 1000 may correspond to an accounting server, such as the accounting server 120 of FIG. 1, the accounting server 120A of FIG. 3, or the accounting server 120B of FIG. 4.

As illustrated, the computing device 1000 includes a CPU 1005, memory 1010, storage 1015, one or more network interfaces 1025, and one or more I/O interfaces 1020. In the illustrated embodiment, the CPU 1005 retrieves and executes programming instructions stored in memory 1010, as well as stores and retrieves application data residing in storage 1015. The CPU 1005 is generally representative of a single CPU and/or GPU, multiple CPUs and/or GPUs, a single CPU and/or GPU having multiple processing cores, and the like. The memory 1010 is generally included to be representative of a random access memory. Storage 1015 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 1035 (such as keyboards, monitors, etc.) are connected via the I/O interface(s) 1020. Further, via the one or more network interfaces 1025, the computing device 1000 can be communicatively coupled with one or more other devices and components (e.g., via a network, which may include the Internet, local network(s), and the like). As illustrated, the CPU 1005, memory 1010, storage 1015, network interface(s) 1025, and I/O interface(s) 1020 are communicatively coupled by one or more buses 1030. The network interface 1025 connects to a wireless communication network (e.g., a network following the IEEE 802.11 standard) via one or more antennas.

In the illustrated embodiment, the memory 1010 includes an accounting module 1050, an aggregation module 1055, an authentication module 1060, and an authorization module 1065, which may perform one or more embodiments discussed above. Although depicted as discrete components for conceptual clarity, in embodiments, the operations of the depicted components (and others not illustrated) may be combined or distributed across any number of components. Further, although depicted as software residing in memory 1010, in embodiments, the operations of the depicted components (and others not illustrated) may be implemented using hardware, software, or a combination of hardware and software.

In one embodiment, the accounting module 1050 may manage the process of user accounting, which involves tracking and recording usage statistics by an authenticated user or client device (e.g., STA MLD). For example, in some embodiments, the accounting module 1050 may process the accounting-start request sent by an AP MLD (or a WLC) when a session is initiated. The accounting module 1050 may establish a new session record in the server's accounting database for the user or client device. The accounting module 1050 may send back an accounting-start response to the requesting AP MLD (or the WLC), indicating the server's capability to aggregate statistics reported by different AP MLDs. During the course of the session, the accounting module 1050 may process the interim update messages from the requesting AP MLD (or the WLC), and update and modify the session record based on these messages. At the end of the session, the accounting module 1050 may process the accounting-stop request sent by the AP MLD (or the WLC) when the session ends. The accounting module 1050 may finalize the session record with the final statistics updated by the AP MLD (or the WLC). The accounting module 1050 may send back an accounting-stop response, acknowledging the reception of the final statistic as tracked by the requesting AP MLD (or the WLC).

In one embodiment, the aggregation module 1055 may manage the process of coordinating and aggregating statistics regarding the network activity of the user or client device (e.g., STA MLD) network activity, especially when the user or client device connects to multiple AP MLDs (or multiple WLCs). The AP MLDs (or WLCs) may send accounting-start requests, interim update messages, or accounting-stop requests when a network session starts, continues or ends. Each of these messages may contain the usage statistics of the user or client device tracked by a respective AP MLD (or WLC). The aggregation module 1055 may process these messages and identify the statistics associated with the same user or client device (e.g., STA MLD). In some embodiments, the identification may be performed based on the address (e.g., MAC address) of the user or client device contained in each respective accounting-start request. In some embodiments, the aggregation module 1055 may create a consolidated session record in the server's database that combines all data reported from different AP MLDs (or WLCs) associated with the same user or client device (e.g., STA MLD).

In one embodiment, the authentication module 1060 may manage the process of user authentication. For example, when a user or client device (e.g., a STA MLD) attempts to connect to a network via an AP or an AP MLD, the AP or AP MLD may send an access request message to the accounting server. The account request message may include credentials provided by the user or client device, such as a username and password, or the MAC address of the user device. The authentication module 1060 verifies these credentials against the user database connected to the server to determine whether the user or client device should be granted access.

In one embodiment, the authorization module 1065 may manage the process of user authorization once the user or client device (e.g., STA MLD) has been successfully authenticated. For example, after the user or client device (e.g., STA MLD) has been authenticated and granted access to the network, it may request to use certain network resources or services. The request may then be reviewed by the authorization module, which compares this request against the user's attributes and permissions stored in the user database. If it is determined that the user or client device has the required permission to use the requested resources, the authorization module 1065 may approve the request and send an approval message with specific authorization attributes. Otherwise, the authorization module 1065 may reject the request and send a rejection message.

In the illustrated example, the storage 1015 includes session records 1075, and logs 1070 of all requests and responses that the server receives and transmits during a recording session. Although depicted as residing in storage 1015, the session records 1075 and logs 1070 of all requests and responses may be stored in any suitable location, such as a remote database (e.g., 125 of FIG. 1).

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
    establishing, by a first network device, a first communications link with a second network device;
    transmitting, by the first network device, a first accounting request to a third network device, wherein the first accounting request indicates that the second network device comprises a station multi-link device (STA MLD);
    receiving, by the first network device, a first accounting response indicating whether the third network device supports statistic aggregation;
    collecting, by the first network device, traffic statistics for the first communication link; and
    reporting the traffic statistics to the third network device in accordance with the first accounting response.

2. The method of claim 1, wherein the first accounting response indicates that the third network device supports statistic aggregation.

3. The method of claim 2, wherein:
    the third network device aggregates the traffic statistics received from the first network device with traffic statistics received from one or more other network devices, and
    each respective network device of the one or more other network devices connects to the second network device via a respective communication link.

4. The method of claim 1, wherein the first accounting response indicates that the third network device does not support statistic aggregation.

5. The method of claim 4, wherein:
    the first accounting response further indicates that the first network device is a primary network device,
    the first network device aggregates traffic statistics received from one or more other network devices, and
    reporting the traffic statistics to the third network device comprises transmitting, by the first network device, the aggregated traffic statistics to the third network device.

6. The method of claim 4, wherein the first accounting response further indicates that a fourth network device is a primary network device.

7. The method of claim 6, wherein reporting the traffic statistics to the third network device comprises transmitting, by the first network device, the traffic statistics to the fourth network device.

8. The method of claim 6, wherein:
    the fourth network device connects to the second network device via a second communication link,
    the fourth network device aggregates the traffic statistics for the second communication link with the traffic statistics received from the first network device for the first communication link, and
    the fourth network device reports the aggregated traffic statistics to the third network device.

9. The method of claim 6, wherein the first accounting response was transmitted by the third network device in response to determining that an accounting session for the second network device was already established by the fourth network device to track traffic statistics for a second communication link between the second and fourth network devices.

10. The method of claim 1, wherein the third network device tracks traffic statistics for the second network device on a per-link basis.

11. The method of claim 1, wherein the first network device comprises one of an access point (AP), or a wireless local area network (LAN) controller (WLC).

12. A system, comprising:
    one or more computer processors; and
    a memory containing a program which when executed by the one or more computer processors performs an operation, the operation comprising:
        establishing, by a first network device, a first communications link with a second network device;
        transmitting, by the first network device, a first accounting request to a third network device, wherein the first accounting request indicates that the second network device comprises a station multi-link device (STA MLD);
        receiving, by the first network device, a first accounting response indicating whether the third network device supports statistic aggregation;
        collecting, by the first network device, traffic statistics for the first communication link; and
        reporting the traffic statistics to the third network device in accordance with the first accounting response.

13. The system of claim 12, wherein the first accounting response indicates that the third network device supports statistic aggregation.

14. The system of claim 13, wherein:
    the third network device aggregates the traffic statistics received from the first network device with traffic statistics received from one or more other network devices, and
    each respective network device of the one or more other network devices connects to the second network device via a respective communication link.

15. The system of claim 12, wherein the first accounting response indicates that the third network device does not support statistic aggregation.

16. The system of claim 15, wherein:
    the first accounting response further indicates that the first network device is a primary network device,
    the first network device aggregates traffic statistics received from one or more other network devices, and
    reporting the traffic statistics to the third network device comprises transmitting, by the first network device, the aggregated traffic statistics to the third network device.

17. The system of claim 15, wherein the first accounting response further indicates that a fourth network device is a primary network device.

18. The system of claim 17, wherein reporting the traffic statistics to the third network device comprises transmitting, by the first network device, the traffic statistics to the fourth network device.

19. The system of claim 17, wherein:
    the fourth network device connects to the second network device via a second communication link,
    the fourth network device aggregates the traffic statistics for the second communication link with the traffic statistics received from the first network device for the first communication link, and
    the fourth network device reports the aggregated traffic statistics to the third network device.

20. A non-transitory computer-readable medium containing computer program code that, when executed by operation of one or more computer processors, performs an operation comprising:
    establishing, by a first network device, a first communications link with a second network device;
    transmitting, by the first network device, a first accounting request to a third network device, wherein the first accounting request indicates that the second network device comprises a station multi-link device (STA MLD);
receiving, by the first network device, a first accounting response indicating whether the third network device supports statistic aggregation;
collecting, by the first network device, traffic statistics for the first communication link; and
reporting the traffic statistics to the third network device in accordance with the first accounting response.

* * * * *